US009582483B2

(12) United States Patent
DeRoller (10) Patent No.: US 9,582,483 B2
(45) Date of Patent: Feb. 28, 2017

(54) AUTOMATICALLY TAGGING VARIABLE DATA DOCUMENTS

(75) Inventor: Matthew H. DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 744 days.

(21) Appl. No.: 13/548,332

(22) Filed: Jul. 13, 2012

(65) Prior Publication Data

US 2014/0019851 A1 Jan. 16, 2014

(51) Int. Cl.
*G06F 17/00* (2006.01)
*G06F 17/24* (2006.01)

(52) U.S. Cl.
CPC .......... *G06F 17/243* (2013.01); *G06F 17/248* (2013.01)

(58) Field of Classification Search
CPC .................................................. G06F 17/248
USPC ......................................................... 715/243
See application file for complete search history.

(56) References Cited

U.S. PATENT DOCUMENTS

| | | | |
|---|---|---|---|
| 5,781,914 A | 7/1998 | Stork et al. | |
| 6,032,004 A | 2/2000 | Mirabella, Jr. et al. | |
| 7,149,347 B1 * | 12/2006 | Wnek | 382/159 |
| 7,468,805 B2 | 12/2008 | Lo et al. | |
| 7,756,869 B2 | 7/2010 | Hadley et al. | |
| 7,937,398 B2 | 5/2011 | Murthy | |
| 8,060,511 B2 | 11/2011 | Hadley et al. | |
| 9,075,498 B1 * | 7/2015 | Wiggins | G06F 17/30687 |
| 2007/0028165 A1 * | 2/2007 | Cole | 715/517 |
| 2007/0055929 A1 | 3/2007 | Giannetti et al. | |
| 2008/0005265 A1 | 1/2008 | Miettinen et al. | |
| 2009/0144615 A1 * | 6/2009 | Brown et al. | 715/243 |

FOREIGN PATENT DOCUMENTS

EP 1748365 A1 * 1/2007 ........... G06F 17/218

OTHER PUBLICATIONS

US 7,310,640, 12/2007, Purvis et al. (withdrawn)
Translating Photoreceptor Treatment Applicator, IP.com Prior Art Database, IPCOM000172030D, Jun. 25, 2008, pp. 1-4.
U.S. Appl. No. 13/070,278, Mathew DeRoller et al., filed Mar. 23, 2011.

* cited by examiner

*Primary Examiner* — Andrew McIntosh
(74) *Attorney, Agent, or Firm* — Gibb & Riley, LLC (57) ABSTRACT

Systems and methods inputting a plurality of different input documents, automatically identify repeated elements and unique elements within each of the different input documents, and automatically generate templates having the repeated elements and dynamic objects corresponding to the unique elements. The repeated elements are similar for all documents that are represented by a given template, and the unique elements have at least one difference between documents that are represented by the given template. The dynamic objects are placeholders for the unique elements within the templates. The systems and methods automatically store variable data for each of the dynamic objects from the unique elements, output the templates and the variable data, and receive user acceptance and refusal of the templates. The systems and methods automatically learn patterns of acceptable template objects and refuse template objects based on the user acceptance and refusal, and automatically revise the processes for generating the templates.

16 Claims, 5 Drawing Sheets

AUTOMATICALLY TAGGING VARIABLE DATA DOCUMENTS

BACKGROUND

Embodiments herein generally relate to variable documents and more particularly to automated systems and methods for creating variable documents from static documents.

Variable Data Printing (VDP) is a form of on-demand printing in which dynamic elements such as text, graphics, and images may be changed from one printed piece to the next, without stopping or slowing the printing process, using variable information from a database or external file.

In order to take advantage of variable data printing, a customer may request that a vendor convert static documents to variable data documents. Depending on the complexity of the document, the conversion process can be lengthy, because all dynamic data elements need to be identified (and their variations as well) by a designer or developer. The process of identifying and tagging variable data elements in a document can be time consuming. For example, the conversion of 400 static documents to variable documents can take an individual 100-200 hours to tag, which is a serious impediment to the utilization of variable data printing.

SUMMARY

Exemplary methods herein input a plurality of different input documents into a computerized device, automatically identify repeated elements and unique elements within each of the different input documents, using the computerized device, and automatically identify locations of the repeated elements and the unique elements within each of the different input documents, using the computerized device. Such exemplary methods then automatically generate templates having the repeated elements in locations corresponding to the repeated elements and dynamic objects in locations corresponding to the unique elements, using the computerized device.

The repeated elements are similar or identical for all documents that are represented by a given template. The unique elements have at least one difference between the documents that are represented by the given template, and the dynamic objects comprise a location placeholder for the unique elements within the templates. Further, these methods can automatically give different names to each of the dynamic objects, using the computerized device These methods automatically store variable data for each of the dynamic objects from the unique elements in a non-transitory storage medium of the computerized device. Also, the methods output the templates and the variable data from a user interface of the computerized device and, in response, receive user acceptance and refusal of the objects in the templates into the user interface of the computerized device. Acceptance of a template object can simply occur when there is lack of user refusal. Then, such methods can automatically learn patterns of acceptable template objects and refused template objects based on the user acceptance and refusal, using the computerized device. This learning process can occur during supervised and unsupervised modeled training programs, that occur before actual user interaction, and the learning process can continue during actual user interaction as the systems and methods herein are used by actual users creating actual templates that will print commercially valuable variable documents. This also allows the methods to automatically and continually dynamically revise the process of identifying the repeated elements and the unique elements, and the process of generating the templates for additional documents, based on the patterns of acceptable template objects and refused template objects, all using the computerized device.

When learning the patterns of acceptable template objects and refused template objects, the methods herein can learn acceptable data lengths, acceptable locations, acceptable data types (photos, text, addresses, names, URL's, e-mail addresses, phone numbers, etc.) for the unique elements. When identifying the repeated elements, the methods do so based on a similarity standard, and when learning the patterns of acceptable template objects and refused template objects, the methods herein can alter such a similarity standard.

Computerized device embodiments herein include a processor, an input/output operatively connected to the processor, a non-transitory storage medium operatively connected to the processor, a graphic user interface operatively connected to the processor, etc. The input/output receives a plurality of different input documents. The processor automatically identifies repeated elements and unique elements within each of the different input documents, and the processor automatically generates templates having the repeated elements and dynamic objects corresponding to the unique elements. The repeated elements are similar or identical for all documents that are represented by a given template, and the unique (dynamic) elements have at least one difference between documents that are represented by the given template.

The dynamic objects act as placeholders for the unique elements within the templates. The processor automatically stores variable data for each of the dynamic objects from the unique elements in the non-transitory storage medium. The user interface outputs the templates and the variable data to the user and, in response, the user interface receives user acceptance and refusal of objects within the templates. The processor automatically learns patterns of acceptable template objects and refused template objects based on the user acceptance and refusal. The processor automatically revises the process of identifying the repeated elements and the unique elements, and the process of generating the templates for additional future documents, based on the patterns of acceptable template objects and refused template objects.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, identifying and tagging variable data elements in static documents can be time consuming, which is a serious impediment to the utilization of variable data printing. Therefore, the embodiments herein provide systems and methods for automatically tagging complex static documents using a machine learning pattern recognition approach. The systems and methods herein output a tagged variable data document automatically and help mitigate requiring a human to perform the tagging, thereby eliminating a considerable amount of labor conventionally required for creating variable data documents.

Thus, the systems and methods herein reduce manual effort required to convert static documents to variable documents. While the bulk of the conversion effort is usually required upfront when bringing, for example, a new Web-to-Print solution online, the systems and methods herein also help with ongoing maintenance (e.g., when new documents are added, or variable data logic is changed and needs to be propagated to all documents, etc.). A typical Web-to-Print portal allows customers to order both static and variable print documents for either internal use, or as part of other processes. Variable documents are preferred, because they allow information and images to be dynamic, and personalized.

Figure 1:
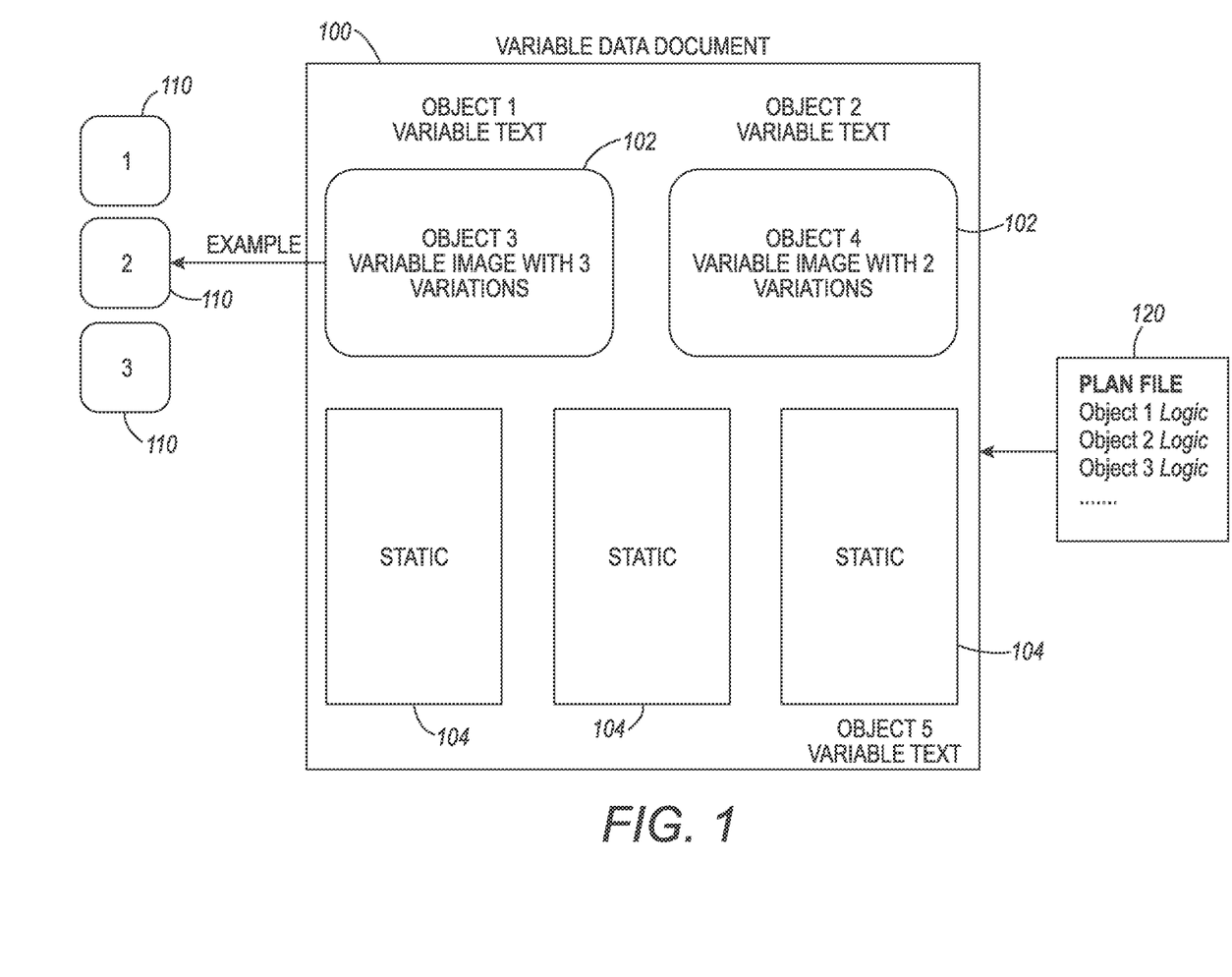
FIG. 1 is a schematic diagram of a variable data document according to embodiments herein.

FIG. 1 illustrates an example of a variable data document 100 that has been automatically tagged with dynamic objects 102 and static objects 104, and its associated plan file 120. FIG. 1 also illustrates variable data 110 that is eventually merged into the dynamic objects 102 when the variable data document is printed. Conventional processes require a designer or developer to tag such document manually; however, document 100 had been tagged automatically. The plan file 120 has definition placeholders for all variable data objects 102 in the document 100. The plan file 120 can also include complex logic for the variable objects (e.g., multiple variations of images dependent on user selection, dynamic text dependent on if-then-else logic, etc.).

Figure 2:
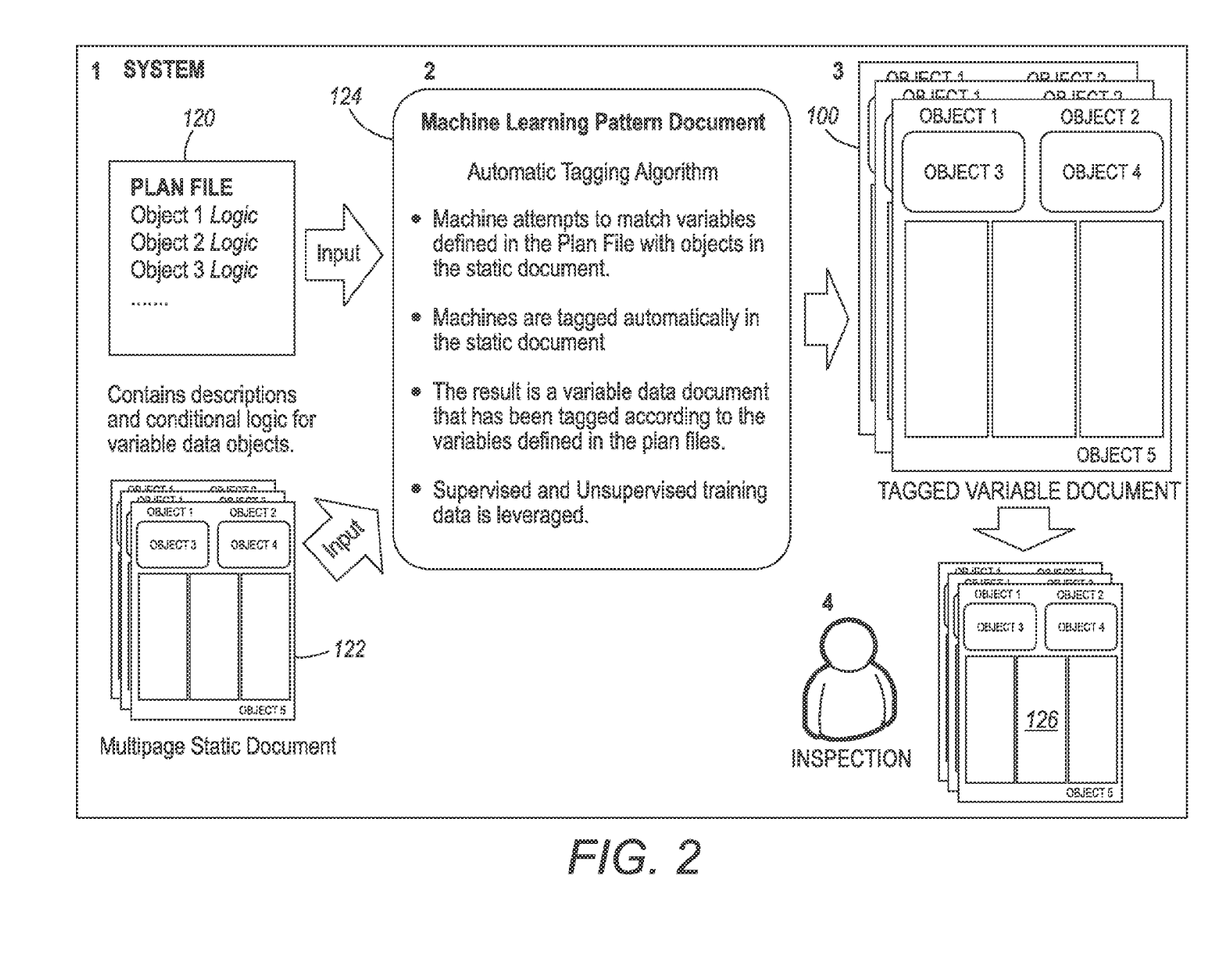
FIG. 2 is a schematic diagram of a variable data document flow according to embodiments herein.

Thus, as shown in FIG. 2, one feature herein is the leveraging a pattern recognition approach for automatically tagging of items in one or more static documents 122 using variables defined in the plan file 120. The systems and methods herein provide a machine learning pattern recognition approach 124, which can use fuzzy logic. Such approaches match variables in the plan file 120 with objects 102, 104 (shown in FIG. 1) in at least one static document 122 and then tag the objects 102, 104 automatically. For example, an object may be a person's name, a signature, an image, or financial data. The automatically tagged document is again shown as item 100 and the printed variable document is shown as item 126.

The systems and methods herein can use both supervised and unsupervised learning procedures to generate output values in item 124. For supervised learning, the training data is provided to the learning procedure through hand labeling (sample documents are tagged by hand) and a model is generated. For unsupervised learning, inherent patterns are found automatically and the correct output value is generated.

Continuing with the previous example, Web-to-Print sites usually have many variable documents that are similar in nature. Thus, for example, a site that prints financial statements for investment portfolios would leverage the same set of variable data objects across multiple variable documents. The training data for machine learning and pattern recognition 124 is applicable to all of these documents.

Figure 3:
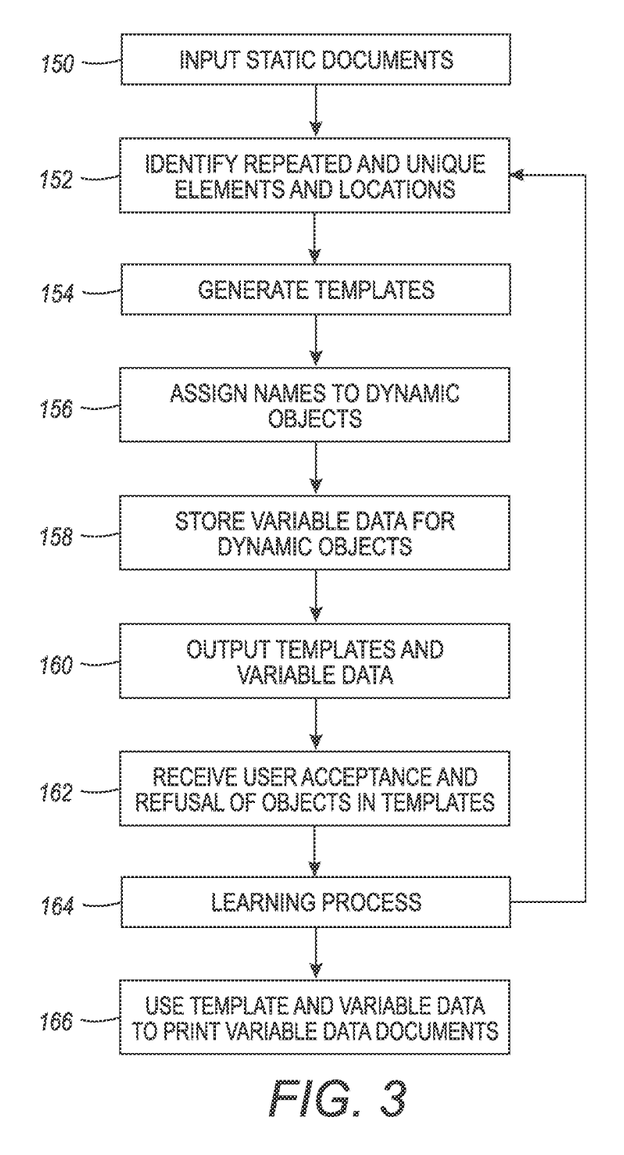
FIG. 3 is a flow diagram illustrating various embodiments herein.

FIG. 3 is flowchart illustrating exemplary methods herein. In item 150, the methods input a plurality of different input documents into a computerized device. For example, previously printed documents can be scanned, using a flatbed or automatic document feed scanner. Alternatively, electronic versions of documents can be input. Additionally, images of documents can be input and then various processing, such as optical character recognition (OCR), can be performed on the images.

Next, in item 152, such methods automatically identify repeated elements and unique elements within each of the different input documents, and simultaneously automatically identify locations of the repeated elements and the unique elements within each of the different input documents, using the computerized device. The repeated elements are similar or identical for all documents that are represented by a given template. The unique elements have at least one difference between the documents that are represented by the given template, and the dynamic objects comprise a location placeholder for the unique elements within the templates.

For example, if the same text appears in the same location in many different input documents, that text would be classified as a repeated (static) element. Similarly, if the same photograph or image appeared in the same location in different input documents, it also would be classified as a repeated element. Further, even slightly different elements (different resolutions of the same image, text that is more than 95% the same, etc.) can be considered similar enough to be the same element and therefore be a repeated (static) element. Elements that do not comply with the similarity standard will be considered unique (dynamic) elements.

The systems and methods herein also provide user preference settings that can be changed by the user to adjust how closely elements must match in order to be considered repeated elements. For example, the scale of similarity can be presented to the user in percentages (90%, 75%, 60%, etc.); can be presented to the user in more generic terms (exactly the same, very close, fairly close, close, etc.); or a sliding graphical bar scale or other graphical representation can be utilized to allow the user to adjust how similar items must be to be considered repeated elements.

In addition, the systems and methods herein can interpret the textural data in item 152 to determine what type of data the element represents to evaluate whether it should be considered static or dynamic. For example, data which matches a common address format (having a number; street name; town name; state; and zip code, etc.) can always be considered unique elements, irrespective of the number of times they are exactly repeated in multiple documents. Similar types of data which can always be considered unique elements include signatures, proper names, monetary amounts, e-mail addresses, universal resource locators (URLs), telephone numbers, etc.

Further, regarding the locations of the repeated elements identified in item 152, if an element having sufficient similarity appears in different locations of a document, it can still be identified as a repeated element and assigned to an arbitrary location. This arbitrary location can be, for example, the most commonly occurring location where the repeated element was found, the first location where the repeated element was found, the last location where the repeated element was found, or some other location.

Such exemplary methods then automatically generate templates having the repeated elements in locations corresponding to the repeated elements and dynamic objects in locations corresponding to the unique elements in item 154, using the computerized device. If an exact match was not required for items to be considered repeated elements, the most appropriate or most useful example of a repeated element is used in the template. Such a most appropriate or most useful example of a repeated element can be the highest resolution image of similar images, the most commonly occurring text for similar textual elements, etc.

Further, these methods can automatically give different names to each of the dynamic objects in item 156, using the computerized device. For example, if some of the dynamic objects are identified because they are specific type of data, they can be given names corresponding to that type of data. Thus, the first time a zip code unique element is encountered, it can be named (labeled) "zip code 1" in the template; the second time it can be named "zip code 2"; etc. Similarly, other types of data can be given names corresponding to the type of data the dynamic objects represent. Otherwise, arbitrary names (given unique serial numbers, etc.) can be given to the dynamic objects in a template.

These methods automatically store variable data for each of the dynamic objects from the unique elements in a non-transitory storage medium of the computerized device in item 158. Also, the methods output the templates and the variable data from a user interface of the computerized device in item 160 and, in response, receive user acceptance and refusal of the objects in the templates into the user interface of the computerized device in item 162. For example, when viewing the proposed template on a graphic user interface display, the user can enter a specific key ("y" or "n", etc.) can check a box, can make a menu selection ("accept" or "refuse"; "keep" or "reject"; "static" or "dynamic"; etc.) or provide some other form of input in the graphic user interface to indicate that a certain item is correctly identified in the proposed template as being a static or dynamic object. Acceptance of a template object can simply occur when there is lack of user refusal.

This allows such methods to automatically learn patterns of acceptable template objects and refused template objects based on the user acceptance and refusal in item 164, using the computerized device. This learning process in item 164 can occur during supervised and unsupervised modeled training programs, which occur before actual user interaction. Additionally, the learning process 164 can also continue during actual user interaction as the systems and methods herein are used in the field by paying users creating production templates that will print commercially valuable variable documents (non-modeling, non-testing environment). This also allows the methods to automatically and continually dynamically revise the process of identifying the repeated elements and the unique elements 152, and the process of generating the templates for additional future documents 154, based on the patterns of acceptable template objects and refused template objects, throughout the useful life of the systems and methods herein, all using the computerized device (as shown by the arrow returning processing from item 164 to item 152 in FIG. 3.

When learning the patterns of acceptable template objects and refused template objects in item 164, the methods herein can learn the acceptable data lengths, acceptable locations, acceptable data types (photos, text, addresses, names, URL's, e-mail addresses, phone numbers, etc.) for the unique elements. When identifying the repeated elements, the methods do so based on a similarity standard, and when learning the patterns of acceptable template objects and refused template objects, the methods herein can alter such a similarity standard. Finally, in item 166, the template and variable data is used to print variable data documents as necessary.

Figure 4:
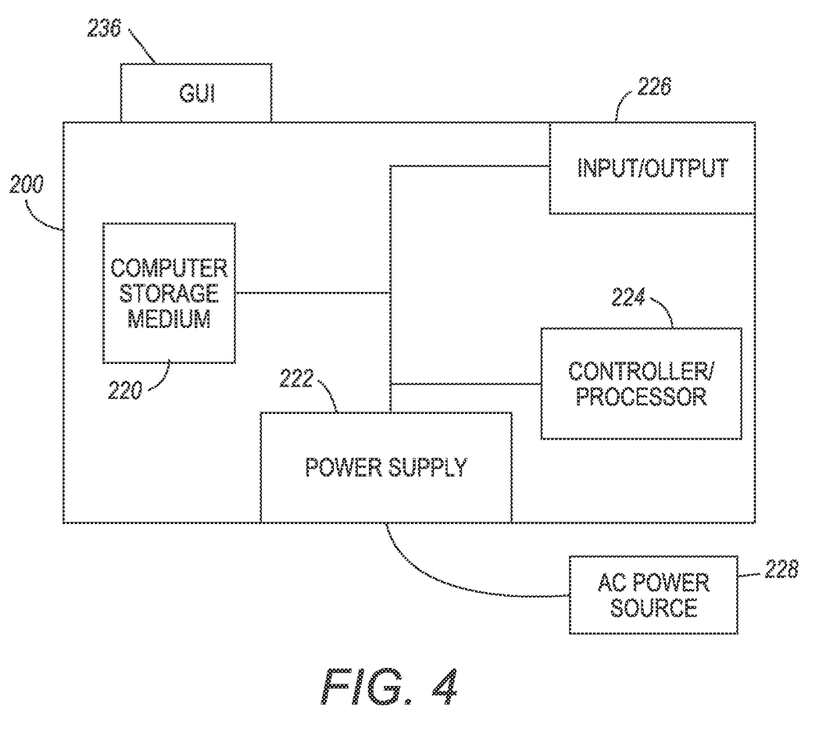
FIG. 4 is a schematic diagram of a computerized device according to embodiments herein.

FIG. 4 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to the computerized network 200 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 5:
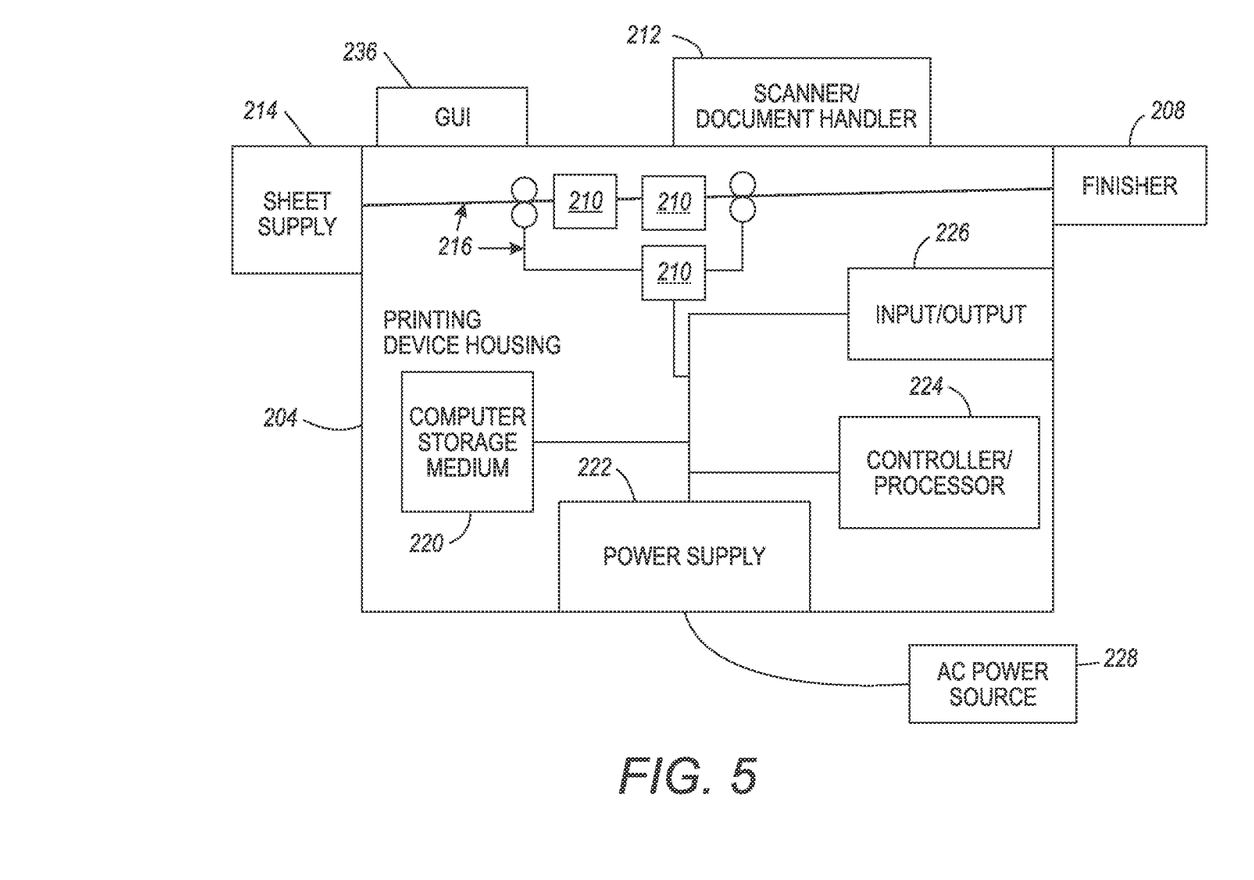
FIG. 5 is a schematic diagram of a computerized printing device according to embodiments herein.

FIG. 5 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

In such a computerized (printing) device 200, 204, the processor 224 automatically identifies repeated elements and unique elements within each of the different input documents, and the processor 224 automatically generates templates having the repeated elements and dynamic objects corresponding to the unique elements. The repeated elements are similar or identical for all documents that are represented by a given template, and the unique (dynamic) elements have at least one difference between documents that are represented by the given template.

The dynamic objects act as placeholders for the unique elements within the templates. The processor 224 automatically stores variable data for each of the dynamic objects from the unique elements in the non-transitory storage medium 220. The user interface 236 outputs the templates and the variable data to the user and, in response, the user interface 236 receives user acceptance and refusal of objects within the templates. The processor 224 automatically learns patterns of acceptable template objects and refused template objects based on the user acceptance and refusal. The processor 224 automatically revises the process of identifying the repeated elements and the unique elements, and the process of generating the templates for additional documents, based on the patterns of acceptable template objects and refused template objects. The variable data documents can be printed using the printing engines 210.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:
   inputting a plurality of different input documents into a computerized device;
   receiving user input to identify a similarity standard that determines how closely elements of said different input documents must match in order to be considered repeated elements;
   automatically identifying said repeated elements and unique elements within each of said different input documents based on said similarity standard, using said computerized device;
   automatically generating one or more templates using said repeated elements and unique elements within said different input documents using said computerized device, said templates being generated to have said repeated elements and dynamic objects corresponding to said unique elements, said repeated elements being similar for all documents that are represented by a given template, said unique elements having at least one difference between said documents that are represented by said given template, and said dynamic objects comprising a placeholder for said unique elements within said templates;
   automatically storing variable data for each of said dynamic objects from said unique elements in a non-transitory storage medium of said computerized device;
   outputting said templates and said variable data from a user interface of said computerized device;
   receiving user acceptance and refusal of said repeated elements and said dynamic objects in said templates into said user interface of said computerized device;
   automatically learning patterns of acceptable template objects and refused template objects based on said user acceptance and refusal, using said computerized device; and
   automatically revising said identifying of said repeated elements and said unique elements and said generating of said templates for additional documents, based on using said patterns of acceptable template objects and refused template objects to alter said similarity standard, using said computerized device.

2. The method according to claim 1, said learning of said patterns of acceptable template objects and refused template objects comprising learning at least one of:
   acceptable data lengths for said unique elements;
   acceptable locations for said unique elements; and
   acceptable data types for said unique elements.

3. The method according to claim 1, further comprising automatically giving different names to each of said dynamic objects, using said computerized device.

4. The method according to claim 1, said repeated elements being identical for all said documents that are represented by said given template.

5. A method comprising:
   inputting a plurality of different input documents into a computerized device;
   receiving user input to identify a similarity standard that determines how closely elements of said different input documents must match in order to be considered repeated elements;
   automatically identifying said repeated elements and unique elements within each of said different input documents based on said similarity standard, using said computerized device;
   automatically identifying locations of said repeated elements and said unique elements within each of said different input documents, using said computerized device;
   automatically generating one or more templates using said repeated elements and unique elements within said different input documents using said computerized device, said templates being generated to have said repeated elements in locations corresponding to said repeated elements and dynamic objects in locations corresponding to said unique elements, said repeated elements being similar for all documents that are represented by a given template, said unique elements having at least one difference between said documents that are represented by said given template, and said dynamic objects comprising a location placeholder for said unique elements within said templates;

automatically storing variable data for each of said dynamic objects from said unique elements in a non-transitory storage medium of said computerized device;

outputting said templates and said variable data from a user interface of said computerized device;

receiving user acceptance and refusal of said repeated elements and said dynamic objects in said templates into said user interface of said computerized device;

automatically learning patterns of acceptable template objects and refused template objects based on said user acceptance and refusal, using said computerized device; and automatically revising said identifying of said repeated elements and said unique elements and said generating of said templates for additional documents, based on using said patterns of acceptable template objects and refused template objects to alter said similarity standard, using said computerized device.

6. The method according to claim 5, said learning of said patterns of acceptable template objects and refused template objects comprising learning at least one of:
acceptable data lengths for said unique elements;
acceptable locations for said unique elements; and
acceptable data types for said unique elements.

7. The method according to claim 5, further comprising automatically giving different names to each of said dynamic objects, using said computerized device.

8. The method according to claim 5, said repeated elements being identical for all said documents that are represented by said given template.

9. A computerized device comprising:
a processor;
an input/output operatively connected to said processor;
a non-transitory storage medium operatively connected to said processor; and
a graphic user interface operatively connected to said processor,
said input/output receiving a plurality of different input documents,
said input/output receiving user input to identify a similarity standard that determines how closely elements of said different input documents must match in order to be considered repeated elements;
said processor automatically identifying said repeated elements and unique elements within each of said different input documents based on said similarity standard,
said processor automatically generating one or more templates using said repeated elements and unique elements within said different input documents, said templates being generated to have said repeated elements and dynamic objects corresponding to said unique elements,
said repeated elements being similar for all documents that are represented by a given template,
said unique elements having at least one difference between said documents that are represented by said given template,
said dynamic objects comprising a placeholder for said unique elements within said templates,
said processor automatically storing variable data for each of said dynamic objects from said unique elements in said non-transitory storage medium,
said graphic user interface outputting said templates and said variable data,
said user interface receiving user acceptance and refusal of said repeated elements and said dynamic objects in said templates,
said processor automatically learning patterns of acceptable template objects and refused template objects based on said user acceptance and refusal, and
said processor automatically revising said identifying of said repeated elements and said unique elements and said generating of said templates for additional documents, based on using said patterns of acceptable template objects to alter said similarity standard, and refused template objects.

10. The computerized device according to claim 9, said learning of said patterns of acceptable template objects and refused template objects comprising learning at least one of:
acceptable data lengths for said unique elements;
acceptable locations for said unique elements; and
acceptable data types for said unique elements.

11. The computerized device according to claim 9, said processor automatically giving different names to each of said dynamic objects.

12. The computerized device according to claim 9, said repeated elements being identical for all said documents that are represented by said given template.

13. A non-transitory computer storage medium storing instructions readable by a computerized device, said computerized device executing said instructions to perform a method comprising:
inputting a plurality of different input documents;
receiving user input to identify a similarity standard that determines how closely elements of said different input documents must match in order to be considered repeated elements;
automatically identifying said repeated elements and unique elements within each of said different input documents based on said similarity standard;
automatically generating one or more templates using said repeated elements and unique elements within said different input documents, said templates being generated to have said repeated elements and dynamic objects corresponding to said unique elements, said repeated elements being similar for all documents that are represented by a given template, said unique elements having at least one difference between said documents that are represented by said given template, and said dynamic objects comprising a placeholder for said unique elements within said templates;
automatically storing variable data for each of said dynamic objects from said unique elements;
outputting said templates and said variable data;
receiving user acceptance and refusal of said repeated elements and said dynamic objects in said templates;
automatically learning patterns of acceptable template objects and refused template objects based on said user acceptance and refusal; and
automatically revising said identifying of said repeated elements and said unique elements and said generating of said templates for additional documents, based on using said patterns of acceptable template objects and refused template objects to alter said similarity standard.

14. The non-transitory computer storage medium according to claim 13, said learning of said patterns of acceptable template objects and refused template objects comprising learning at least one of:

acceptable data lengths for said unique elements;
acceptable locations for said unique elements; and
acceptable data types for said unique elements.

15. The non-transitory computer storage medium according to claim 13, said method further comprising automatically giving different names to each of said dynamic objects.

16. The non-transitory computer storage medium according to claim 13, said repeated elements being identical for all said documents that are represented by said given template.

\* \* \* \* \*